US008150982B2

(12) United States Patent
Zhang et al.

(10) Patent No.: US 8,150,982 B2
(45) Date of Patent: Apr. 3, 2012

(54) METHOD, SYSTEM FOR ACCESSING HOME NETWORK DEVICE AND HOME NETWORK ACCESS DEVICE

(75) Inventors: Xiaotian Zhang, Shenzhen (CN); Junxia Xu, Shenzhen (CN); Huangwei Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 143 days.

(21) Appl. No.: 12/616,531

(22) Filed: Nov. 11, 2009

(65) Prior Publication Data
US 2010/0057921 A1 Mar. 4, 2010

Related U.S. Application Data

(63) Continuation of application No. PCT/CN2008/070910, filed on May 8, 2008.

(30) Foreign Application Priority Data

May 11, 2007 (CN) .......................... 2007 1 0104398

(51) Int. Cl.
*G06F 15/16* (2006.01)
*G06F 15/173* (2006.01)
*H04L 12/28* (2006.01)
(52) U.S. Cl. .................. 709/228; 709/220; 370/401
(58) Field of Classification Search ................ 709/228, 709/220; 370/401
See application file for complete search history.

(56) References Cited

U.S. PATENT DOCUMENTS

| 5,724,588 | A | * | 3/1998 | Hill et al. .................. 719/328 |
| 6,735,619 | B1 | | 5/2004 | Sawada |
| 7,194,689 | B2 | | 3/2007 | Manni et al. |
| 7,865,581 | B2 | * | 1/2011 | Straub et al. .................. 709/221 |
| 2004/0205172 | A1 | | 10/2004 | Kim |
| 2005/0108366 | A1 | * | 5/2005 | Bodin et al. .................. 709/220 |
| 2005/0232283 | A1 | * | 10/2005 | Moyer et al. .................. 370/401 |
| 2007/0067431 | A1 | | 3/2007 | Yoshihara et al. |

FOREIGN PATENT DOCUMENTS

| CN | 1523828 A | 8/2004 |
| CN | 1776681 A | 5/2006 |
| CN | 1925439 A | 7/2007 |
| KR | 2006-0064935 A | 6/2006 |

OTHER PUBLICATIONS

"CPE WAN Management Protocol," DSL Forum Technical Report TR-069, 1-109 (May 2004).
$1^{st}$ Office Action in corresponding Chinese Application No. 200710104398.3 (Dec. 21, 2010). $1^{st}$ Office Action in corresponding European Application No. 08734265.5 (Feb. 10, 2011).
Extended European Search Report in corresponding European Application No. 08734265.5 (May 4, 2010).
Written Opinion of the International Searching Authority in corresponding PCT Application No. PCT/CN2008/070910 (Aug. 14, 2008).
$2^{nd}$ Office Action in corresponding Chinese Application No. 200710104398.3 (Oct. 18, 2011).

* cited by examiner

*Primary Examiner* — Philip Lee
(74) *Attorney, Agent, or Firm* — Leydig, Voit & Mayer, Ltd.

(57) ABSTRACT

A method, a system for accessing a home network device, and a home network access device are disclosed. The method includes the steps as follows. A home network access device finds a home network device and obtains information of the home network device through a home network protocol. A data model of the home network device is established in the home network access device according to the information of the home network device. A remote service device accesses the data model of the home network device established in the home network access device through a remote management protocol.

2 Claims, 5 Drawing Sheets

METHOD, SYSTEM FOR ACCESSING HOME NETWORK DEVICE AND HOME NETWORK ACCESS DEVICE

CROSS-REFERENCE TO RELATED APPLICATIONS

This application is a continuation of International Patent Application No. PCT/CN2008/070910, filed May 8, 2008, which claims priority to Chinese Patent Application No. 200710104398.3, filed May 11, 2007, both of which are hereby incorporated by reference in their entireties.

FIELD OF THE TECHNOLOGY

The present invention relates to a network management technique, and more particularly to a method, a system for communicating with a home network device, and a home network access device.

BACKGROUND OF THE INVENTION

A technical report (TR)-069 is a technical specification developed by the digital subscriber line (DSL) forum, and has a full name of "customer premise equipment (CPE) wide area network (WAN) management protocol (CWMP)", which is one of remote management protocols. The protocol provides a universal framework and protocol for management and configuration of a home network device, and is adapted to realize the communication between a remote service device and a home network device. The home network device includes a home gateway, a router, a set-top box, a computer, and the like, and the remote service device may be an auto-configuration server (ACS).

However, in the recent home network, the home network devices are communicated with one another through the network by using a common home network protocol, and a universal plug and play (UPnP) protocol is one of the common home network protocols. Through the UPnP protocol, the device is dynamically added to the network, obtains an Internet protocol (IP) address, and sends an announcement message to a control point in the home network to announce a service of the device. In the home network, a device description in the announcement message from the home network device may be obtained through the control point, and a control message is sent to the home network device to set parameters of operation information in the device description, so as to monitor and manage each home network device in the home network.

It may be known from the above description that in the home network, most of the home network devices communicate with one another through the home network protocol, for example, the UPnP protocol. The ACS communicating with the home network device in the home network to obtain information of the home network device should be realized through a remote management protocol. Referring to FIG. 1, an ACS 101 accesses the home network access device 102 according to the remote management protocol, and accesses a home network device 103 in the home network according to the TR-069 protocol.

It may be known that in the conventional art, if the remote service device intends to access the home network device in the home network, the home network devices must all support the remote management protocol. If the existing home network is not greatly changed, the remote service device cannot access an existing home network device having the mature technique.

SUMMARY OF THE INVENTION

Various embodiments of the present invention provide a method, a system for communicating with a home network device, and a home network access device, so that when a remote service device accesses a home network device, it is unnecessary for all the home network devices to support a remote management protocol.

A method for communicating with a home network device includes the steps as follows.

A home network access device finds a home network device and obtains information of the home network device through a home network protocol.

A data model of the home network device is established in the home network access device according to the information of the home network device.

A remote service device accesses the data model of the home network device established in the home network access device through a remote management protocol.

A system for communicating with a home network device includes a home network device, a home network access device, and a remote service device. The home network device is configured to provide information of itself in a home network. The home network access device is configured to find the home network device and obtain information of the home network device through a home network protocol, and establish a data model of the home network device according to the information of the home network device. The remote service device is configured to access the data model of the home network device established in the home network access device through a remote management protocol.

A home network access device includes a finding unit and a data model establishing unit. The finding unit is configured to find a home network device and obtain information of the home network device through a home network protocol, and provide the information of the home network device to the data model establishing unit. The data model establishing unit is configured to establish and store a data model of the home network device according to the information of the home network device provided by the finding unit, and accept a remote service device to access the data model through a remote management protocol.

It may be known from the technical solution that in a method, a system for accessing a home network device, and a home network access device according to the embodiments of the present invention, the home network access device establishes the data model of the home network device, and the remote service device only needs to access the data model in the home network access device supporting the remote management protocol. In this manner, it is unnecessary for all the home network devices to support the remote management protocol, and the remote service device may access the home network device without changing the existing home network device.

BRIEF DESCRIPTION OF THE DRAWINGS

FIG. 4.b is a second flow chart of the method for accessing the home network device according to an embodiment of the present invention;

FIG. 5.b is a fourth flow chart of the method for accessing the home network device according to an embodiment of the present invention.

DETAILED DESCRIPTION OF THE EMBODIMENTS

In order to make the objectives, technical solutions, and advantages of the present invention comprehensible, embodiments are described in detail below.

In a method for accessing a home network device according to an embodiment of the present invention, a home network access device finds a home network device and obtains information of the home network device through a home network protocol. The home network access device establishes a data model of the home network device in the home network access device according to the information of the home network device. A remote service device accesses the data model of the home network device established in the home network access device through a remote management protocol.

Through the above procedure, the remote service device may access the home network device, so as to obtain the information of the home network device. If the remote service device needs to manage the home network device, the method further includes the following: The remote service device sets management information in the established data model. The home network access device constructs a home network protocol packet and sends the home network protocol packet to the home network device according to the setting.

Figure 1:
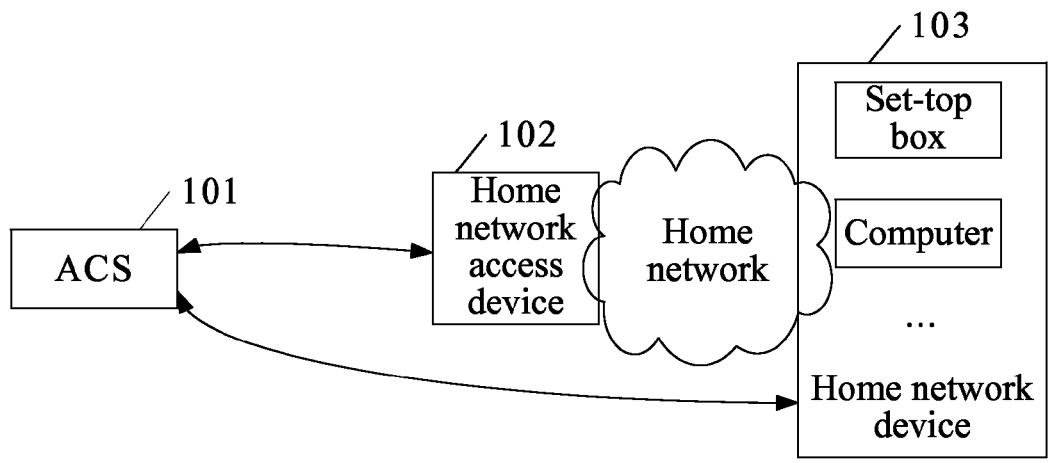
FIG. 1 is a structural view of a system for accessing a home network device in the related art.
Figure 2:
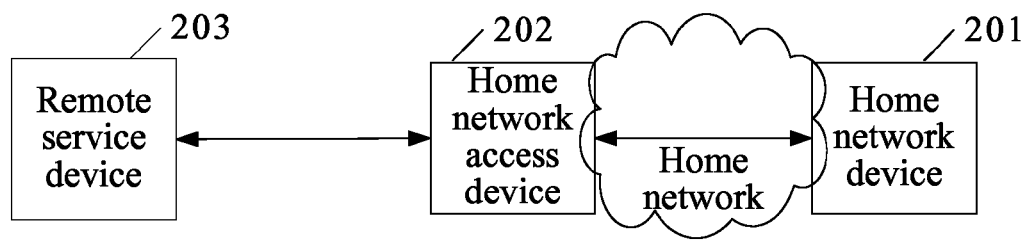
FIG. 2 is a structural view of a communication system for accessing a home network device according to an embodiment of the present invention.

A system for managing a home network device is described in detail as follows. FIG. 2 is a structural view of a system for accessing a home network device according to an embodiment of the present invention. Referring to FIG. 2, the system mainly includes a home network device 201, a home network access device 202, and a remote service device 203.

The home network device 201 is configured to provide information of itself in a home network.

The home network access device 202 is configured to find the home network device 201 and obtain information of the home network device 201, and establish a data model of the home network device in the home network access device 202 according to the obtained information, for example, a description document.

The remote service device 203 is configured to access the data model of the home network device established in the home network access device through a remote management protocol.

When the remote service device 203 needs to manage the home network device 201, the remote service device is further configured to set management information in the data model established in the home network access device 202 through the remote management protocol.

The home network access device 202 is further configured to construct a home network protocol packet according to the setting to the data model by the remote service device 203 and send the home network protocol packet to the home network device 201.

The home network protocol is one or more of a UPnP protocol, a living network control protocol (LnCP), a home audio video interoperability (HAVi) protocol, a Jini protocol, an intelligent grouping and resource sharing (IGRS) protocol, a digital living network alliance (DLNA) protocol, and an ITopHome protocol. The home network device is one or more of a UPnP device, an LnCP device, an HAVi device, a Jini device, an IGRS device, a DLNA device, and an ITopHome device. The home network access device may be a home gateway. The information of the home network device may be the description document of the home network device. The remote management protocol may be a TR-069 protocol or a simple network management protocol (SNMP). The remote service device may be an ACS.

The home network access device 202 is further configured to provide state change information to the remote service device 203, when finding that a state of the home network device 201 is changed. The remote service device 203 is further configured to obtain the state change information of the home network device 201 provided by the home network access device 202.

When the remote service device 203 does not know a standardized service of the home network device 201, the data model established in the home network access device 202 includes a service additional parameter. The service additional parameter is configured to indicate a parameter type and a parameter span in the data model of the home network device 201. The remote service device 203 is further configured to obtain a service provided by the home network device 201 from the data model.

Figure 3:
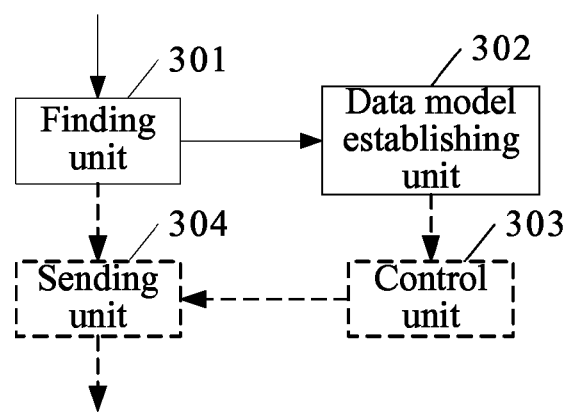
FIG. 3 is a structural view of a home network access device according to an embodiment of the present invention.

FIG. 3 is a structural view of the home network access device. Referring to FIG. 3, the home network access device mainly includes a finding unit 301 and a data model establishing unit 302.

The finding unit 301 is configured to find a home network device and obtain information of the home network device through a home network protocol, and provide the information of the home network device to the data model establishing unit 302.

The finding unit 301 finds the home network device by receiving an announcement message sent from the home network device when accessing the network, and obtains the information of the home network device from the announcement message.

The data model establishing unit 302 is configured to establish and store a data model of the home network device according to the information of the home network device provided by the finding unit 301, and allow a remote service device to access the data model through a remote management protocol.

The home network access device further includes a control unit 303 and a sending unit 304.

The control unit 303 is configured to construct a home network protocol packet according to the setting to the parameters in the data model by the remote service device, and provide the home network protocol packet to the sending unit 304.

The sending unit 304 is configured to send the home network protocol packet provided by the control unit 303.

The finding unit 301 is configured to provide state change information to the sending unit 304 and the data model establishing unit 302 when finding that a state of the home network device is changed.

The sending unit 304 is further configured to send the state change information provided by the finding unit 301.

The data model establishing unit 302 is further configured to set the data model according to the state change information provided by the finding unit.

The method for accessing the home network device according to the embodiment of the present invention is described in detail below. In the embodiments of the method, for example, the home network adopts the UPnP protocol, the home network device is the UPnP device, the home network access device is the home gateway, the remote management protocol is the TR-069 protocol, and the remote service device is the ACS.

For ease of description, firstly the data model established in the home network access device is described in detail, and the established data model may be classified into two types as follows.

In a first type, the established data model includes complete parameters. The data model includes device information objects, service information objects which are a next level of the device information objects, and action information objects which are a next level of the service information objects. The device information objects include device information parameters, the service information objects include service information parameters, and the action information objects include action information parameters. The device information parameter may be, for example, a universal unique identifier (UUID) of the device, a device type, a parameter representing whether the device is on line or not, and a presentation uniform resource locator (URL) of the device. The service information parameter may be a control URL, an event URL, a state variable of the service, and the like. The action information parameter may be parameters of the operation action, an operation execution parameter (invoke), and the like.

For a format of the data model, a first level is the device information objects, and device information parameters are arranged subsequently. A second level is the service information objects, and service information parameters are arranged subsequently. A third level is the action information objects, and action information parameters are arranged subsequently. If other devices exist, the parameters of the data models of the other devices are arranged subsequently according to the format in sequence. The format is shown in Table 1.

TABLE 1

| Name | Description |
| --- | --- |
| UPnPDevice1. | Device information object 1 |
| UUID | UUID of the Device1 |
| devicetype | Device type |
| active (Bool) | Whether the device is on line or not 1: on line, 0: not on line |
| PresentationURL | Presentation URL of the device |
| UPnPDevice1. servicetype1. | Service information object 1 |
| controlURL | Control URL |
| eventURL | Event URL |
| statevariable1 | State variable 1 of the service |
| statevariable2 | State variable 2 of the service |
| . . . | If there are other state variables, the state variables are added in sequence |
| UPnPDevice1. servicetype1.actionname1. | Action information object 1 |
| invoke (Bool) | When the ACS sets the in parameter through an RPC method, the value of the parameter is set to true, the gateway is asked to execute the action, and after the action is completed, the value of the parameter is resumed to false. |
| argument1 | Parameter 1 of the action |
| argument2 | Parameter 2 of the action |
| . . . | If there are other parameters, the parameters are added in sequence |

TABLE 1-continued

| Name | Description |
| --- | --- |
| UPnPDevice1. servicetype1.actionname2. | Action information object 2 |
| . . . | The parameters are consistent with the above UPnPDevice1. servicetype1.actionname1 |
| UPnPDevice1. servicetype2. | Service information object 2 |
| . . . | The objects and the parameters are consistent with the above UPnPDevice1. servicetype1. |
| UPnPDevice2. | Device information object 2 |
| . . . | The objects and the parameters are consistent with the above UPnPDevice1. |

In the second type, the established data model includes a part of the parameters. The data model includes device information objects and service information objects which are a next level of the device information objects. The device information objects include device information parameters. The device information parameter may be, for example, a UUID of the device, a device type, a parameter representing whether the device is on line or not, and a presentation URL of the device. The service information objects include a part of service information parameters, for example, a control URL and an event URL. In the data model, the action information objects and the parameters are not set, but control command information, out parameter information, event subscription information, and state information etc. are set in the service information objects. A format of the data model may adopt the manner as shown in Table 2.

TABLE 2

| Name | Description |
| --- | --- |
| UPnPDevice{i}. | Device information object |
| UUID | UUID of the device{i} |
| devicetype | Device type |
| active (Bool) | Whether the device is on line or not 1: on line, 0: not on line |
| PresentationURL | Presentation URL of the device |
| UPnPDevice{i}. servicetype{i}. | Service information object |
| controlURL | Control URL |
| eventURL | Event URL |
| controlMsg | Control command |
| outargMsg | Out parameter information |
| eventMsg | Event subscription |
| stateMsg | State information |

Figure 4A:
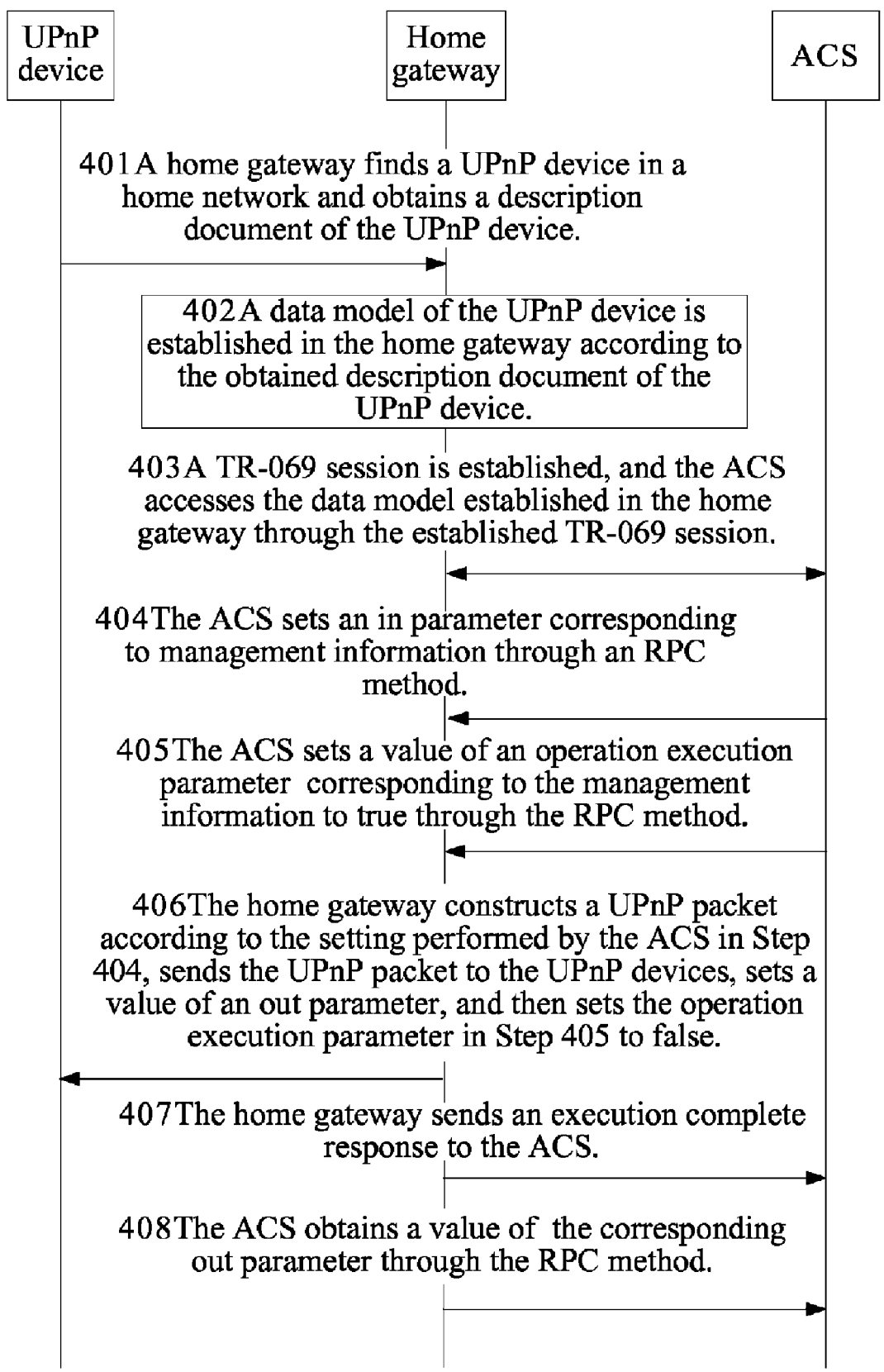
FIG. 4.a is a first flow chart of a method for accessing a home network device according to an embodiment of the present invention.
Figure 4B:
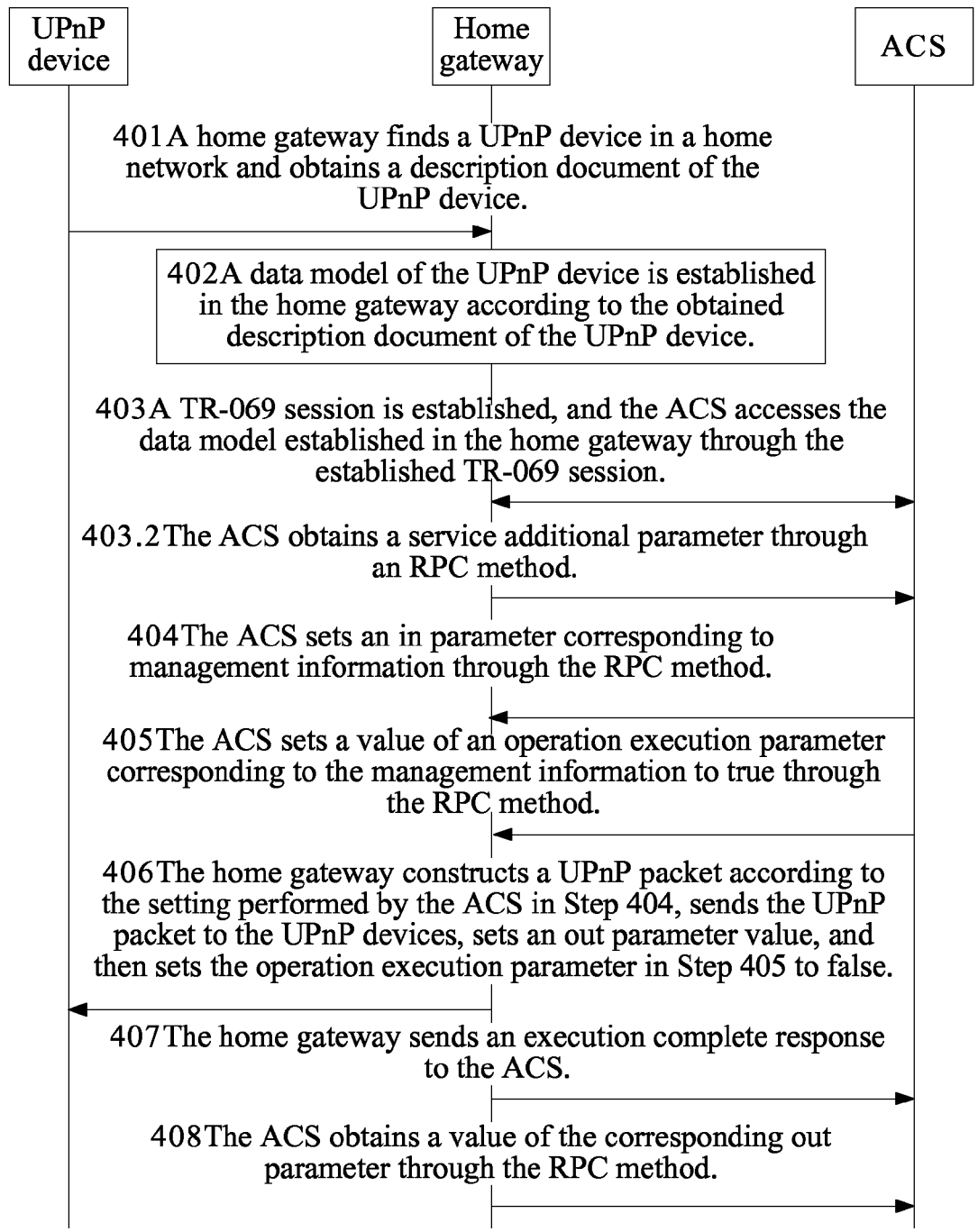

FIG. 4.a is a first flow chart of the method for accessing the home network device according to an embodiment of the present invention. In the embodiment, it is assumed that a service provided by a UPnP device is a standardized service, and an ACS obtains the service provided by the UPnP device. The method of the embodiment is the flow adapted for the first data model. Referring to FIG. 4.a, the method mainly includes the steps as follows.

In Step 401, a home gateway finds a UPnP device in a home network and obtains a description document of the UPnP device.

In this step, when the UPnP device accesses the network, the UPnP device sends an announcement message in the home network. The home gateway obtains the announcement message to find the UPnP device, obtains a URL of the device description from the announcement message, and obtains the description document of the UPnP device through the URL of the device description.

The description document includes an identity of the UPnP device, the provided service, and a state of the device etc.

In Step 402, the home gateway establishes a data model of the UPnP device in the home gateway according to the obtained description document of the UPnP device.

In the step, the home gateway parses the obtained description document of the UPnP device, and establishes the data model of the UPnP device. The data model in the step may adopt the format as shown in Table 1.

In Step 403, a TR-069 session is established between an ACS and the home gateway. The ACS accesses the data model established in the home gateway through the established TR-069 session.

In the step, the ACS and the home gateway communicates through a TR-069 protocol, and after the session is established between the ACS and the home gateway, the data model established in the home gateway is set. The procedure for realizing the step is the conventional art, so it is not described here.

Through Steps 401-403, the ACS completes monitoring the home network device. If the ACS needs to further manage the home network, steps as follows are executed.

In Step 404, the ACS sets an in parameter corresponding to management information through an RPC method.

In this step, for example, the management for the UPnP device includes that the ACS intends to operate an operation actionname1 in a service servicetype1 of a device Device1, the in parameter in UPnPDevice1.servicetype1.actionname1 is found in the data model, and the in parameter is set.

In Step 405, the ACS sets an invoke parameter value corresponding to the management information to true through the RPC method.

The setting in this step is configured to notify the home gateway to start to construct a packet.

In Step 406, the home gateway constructs a UPnP packet according to the setting of the in parameter corresponding to the management information by the ACS in the Step 404, and sends the UPnP packet to the UPnP device, after completing the construction, the home gateway sets a value corresponding to the out parameter, and then sets the invoke value in Step 405 to false.

According to the setting of Step 404, the home gateway may obtain that the ACS performs which operation on which device, so as to construct the UPnP packet including the operation information to the corresponding UPnP device.

The constructed UPnP packet includes the management information for the UPnP device, which is a management manner used in the UPnP protocol of the home network, and the management method for the UPnP device management is the conventional art, so it is not described here.

The UPnP packet's sending to the corresponding UPnP device is accomplished through the control URL parameter corresponding to the management information, and the control URL indicates the UPnP device to be managed.

In this step, after the invoke value is set to false, the home gateway waits for the next setting of the ACS, and after the invoke value is set to true for the next time, the new operation is executed.

In Step 407, the home gateway sends an execution complete response to the ACS. After receiving the response sent from the home gateway, the ACS learns that the management is completed.

In Step 408, the ACS obtains the corresponding out parameter value through the RPC method.

After obtaining the corresponding out parameter value, the ACS learns the state of the home network device after being managed.

In addition, after Step 402, the method may further include the steps as follows. When the state of the UPnP device is changed, a state change event message is sent in the home network. After obtaining the state change event message, the home gateway changes the state variable corresponding to the home network device in the data model, and actively notifies state change information of the UPnP device to the ACS by establishing a TR-069 session.

If the service provided by the UPnP device is not a standardized service, the ACS needs to obtain a parameter type and a parameter span in the service provided by the UPnP device. Here, a service additional parameter (UPnPDescFile/XMLshema) is added to the data model established in the home gateway, so as to indicate the parameter type and the parameter span. The service additional parameter may serve as the device information parameter being added in the data model. Under this situation, a step below needs to be added between Step 403 and Step 404. After obtaining the service additional parameter through the RPC method, the ACS obtains the parameter type and the parameter span of the service provided by the UPnP device. In this manner, the ACS may support the service of the UPNP device expanded by a manufacturer, and the flow thereof may be obtained with reference to FIG. 4.b, in which only Step 403.2 is added as compared with FIG. 4.a.

Figure 5A:
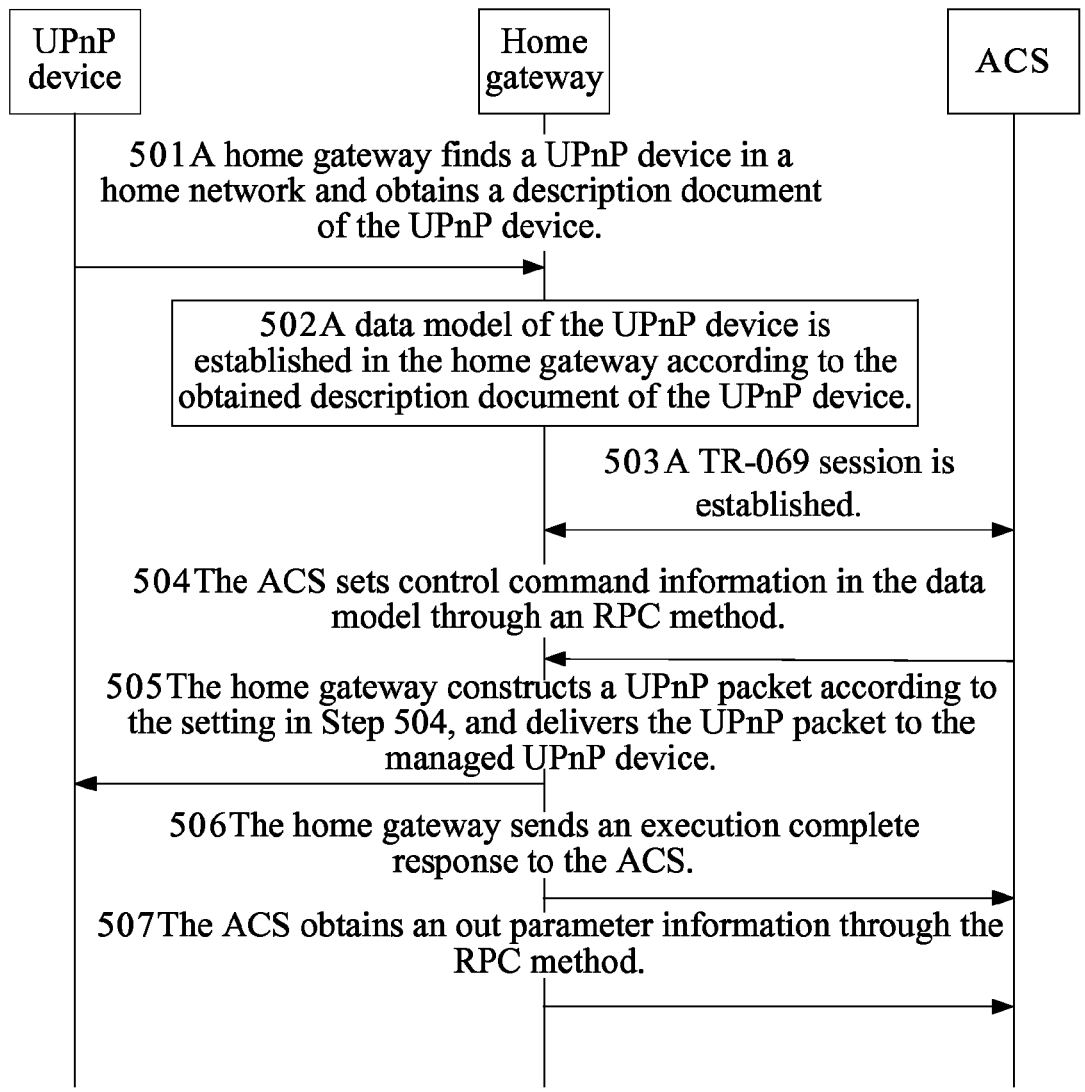
FIG. 5.a is a third flow chart of the method for accessing the home network device according to an embodiment of the present invention.
Figure 5B:
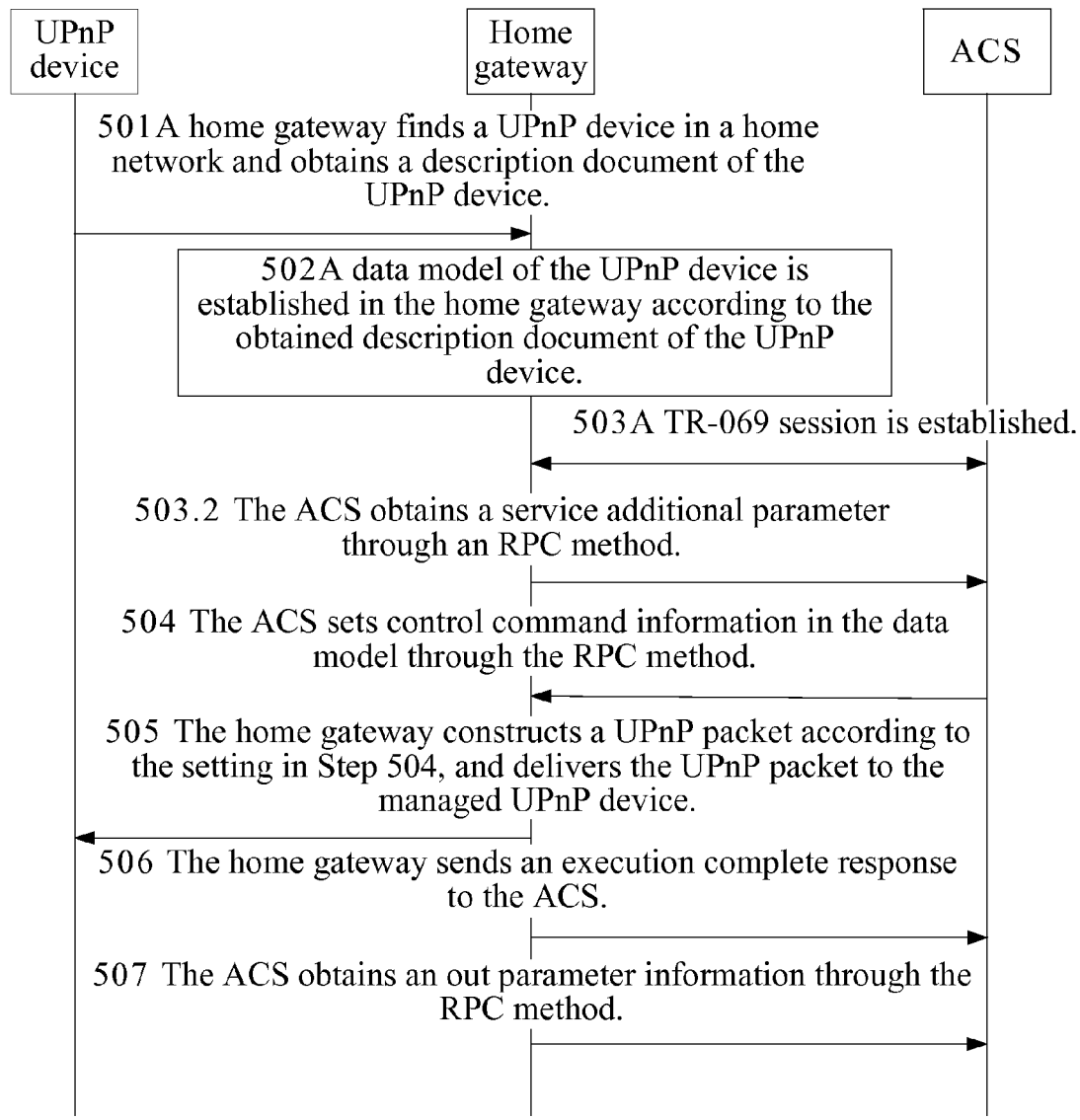

For the second type of data model, a flow chart as shown in FIG. 5.a is adopted. FIG. 5.a is a third flow chart of the method for accessing the home network device according to an embodiment of the present invention. The method mainly includes the steps as follows.

Step 501 is the same as Step 401.

In Step 502, a home gateway establishes a data model of the UPnP device in the home gateway according to an obtained description document of the UPnP device.

In this step, the home gateway parses the obtained description document of the UPnP device, and establishes the data model of the UPnP device. The data model in this step may adopt the format as shown in Table 2.

Step 503 is the same as Step 403.

Similarly, after the steps are executed, the ACS completes the monitoring on the home network device. If the ACS needs to further manage the home network device, the steps as follows must be executed.

In Step 504, the ACS sets control command information in the data model through the RPC method.

In this step, this ACS sets management information for the device which needs to be managed in the control command information (controlMsg) in the data model. The controlMsg includes a name of the operation to be executed, in parameter information of the operation, and the like.

In Step 505, the home gateway constructs a UPnP packet according to the setting in Step 504, delivers the UPnP packet to the managed UPnP device, and then sets out parameter information (OutargMsg).

The constructed UPnP packet includes a control command for the UPnP device, which is a management manner used in the UPnP protocol of the home network, and the management method for the UPnP device is the conventional art, so it is not described here.

In Step 506, the home gateway sends an execution complete response to the ACS. After receiving the response sent from the home gateway, the ACS learns that the management is completed.

In Step 507, the ACS obtains the OutargMsg through the RPC method.

In addition, after Step 502, the method further includes: The ACS sets the event subscription information (eventMsg) in the data model through the RPC method. When a state of the UPnP device is changed, a state change event is sent in the home network, and after obtaining the state change event, the home gateway saves the information of the state variable in the state information (StateMsg), and actively notifies state change information of the UPnP device to the ACS by establishing a TR-069 session.

The above flow is based on a situation assuming that the service provided by the UPnP device is the standardized service, and the ACS has learned the service provided by the UPnP device. If the service provided by the UPnP device is not the standardized service, the ACS needs to obtain a parameter type and a parameter span in the service provided by the UPnP device. Here, a service additional parameter is added to the device information parameters in the data model established in the home gateway, so as to indicate the parameter type and the parameter span. The service additional parameter may serve as the device information parameter being added in the data model. Under this situation, a step below needs to be added between Step 503 and Step 504. After obtaining the service additional parameter through the RPC method, the ACS obtains the parameter type and the parameter span of the service provided by the UPnP device, and the flow thereof may be obtained with reference to FIG. 5.$b$, in which only Step 503.2 is added as compared with FIG. 5.$a$. In this manner, the ACS may support the service of the UPnP device expanded by a manufacturer.

It may be known from the description that in the method, the system for accessing the home network device, and the home network access device according to the embodiments of the present invention, the home network access device establishes the data model of the home network device, and the remote service device only needs to access the data model in the home network access device supporting the remote management protocol. In this manner, only the home network access device needs to support the remote management protocol, and the remote service device may access the home network device without changing other home network devices in the home network.

Further, the remote service device further sets the management information in the data model of the home network device established in the home network access device, and the home network access device constructs the home network protocol packet according to the setting, so as to manage the home network device through the home network protocol. In this manner, only the home network access device needs to support the remote management protocol, and the remote service device may conveniently manage the home network device without changing other home network devices in the home network.

Although the invention being described as some preferred embodiments, the scope for which the protection is sought by the present invention is not limited thereby. Various modifications and variations without departing from the scope of the invention should be considered falling within the scope of the present invention.

What is claimed is:

1. A method for accessing a home network, comprising:
finding, by a home network access device, a home network device, and obtaining information of the home network device through a home network protocol;
establishing, by the home network access device, a data model of the home network device in the home network access device according to the information of the home network device, so that a remote service device accesses the data model of the home network device through a remote management protocol, and
constructing, by the home network access device, a home network protocol packet according to management information set by the remote service device in the established data model of the home network device through the remote management protocol, and sending the home network protocol packet to the home network device;
wherein the established data model of the home network device further comprises device information objects, service information objects which are a next level of the device information objects, and action information objects which are a next level of the service information objects; and
the device information objects further comprise device information parameters, the service information objects comprise service information parameters, and the action information objects comprise action information parameters;
the action information parameters further comprise an in parameter and an operation execution parameter invoke, and the action information parameters comprise an out parameter, and
the constructing, by the home network access device, the home network protocol packet according to management information set by the remote service device in the established data model of the home network device through the remote management protocol comprises:
accepting, by the home network access device, the remote service device setting the in parameter corresponding to the management information through a remote procedure call (RPC) method, and accepting the remote service device setting an invoke parameter value corresponding to the management information through the RPC method to be true;
constructing, by the home network access device, the home network protocol packet comprising corresponding operation information according to the setting of the in parameter corresponding to the management information by the remote service device; and
setting, by the home network access device, the value of the invoke parameter corresponding to the management information to be false, after setting a value of an out parameter corresponding to the management information, so that the remote service device obtains the value of the out parameter corresponding to the management information through the RPC method.

2. A method for accessing a home network, comprising:
finding, by a home network access device, a home network device, and obtaining information of the home network device through a home network protocol;
establishing, by the home network access device, a data model of the home network device in the home network access device according to the information of the home network device, so that a remote service device accesses the data model of the home network device through a remote management protocol; and
constructing, by the home network access device, a home network protocol packet according to management information set by the remote service device in the established data model of the home network device through the remote management protocol, and sending the home network protocol packet to the home network device;
wherein the established data model of the home network device further comprises device information objects, and service information objects which are a next level of the device information objects, the device information objects further comprise device information parameters;

the service information objects further comprise control command information parameters, and the service information objects comprise out parameter information, wherein the setting, by the remote service device, the management information in the established data model of the home network device through the remote management protocol comprises: setting, by the remote service device, the management information in the control command information parameters of the data model through a remote procedure call (RPC) method, wherein the constructing, by the home network access device, the home network protocol packet according to the setting comprises: constructing, by the home network access device, the home network protocol packet corresponding to a control command according to control command information of the data model, and setting the out parameter information, after the sending the home network protocol packet to the home network device, the method further comprises: accepting the remote service device obtaining the out parameter information in the service information objects through the RPC method;

the service information objects comprise event subscription information and state information; and after establishing the data model of the home network device, the method further comprises: accepting, by the home network access device, the remote service device setting the event subscription information through the RPC method; changing, by the home network access device, the state information in the data model according to a state change event message of the home network device after obtaining the state change event message, and notifying state change information of the home network device to the remote service device through the remote management protocol.

* * * * *